3,252,939
POLYMERS OF TRIOXANE AND A 2,4-BENZODIOXEPIN

Percy Arthur Small, Welwyn Garden City, England, assignor to Imperial Chemical Industries Limited, London, England, a corporation of Great Britain
No Drawing. Filed Dec. 10, 1962, Ser. No. 243,625
Claims priority, application Great Britain, Dec. 14, 1961, 44,818/61
10 Claims. (Cl. 260—67)

The present invention relates to a process for the preparation of oxymethylene polymers and to the oxymethylene polymers so prepared.

Oxymethylene polymers, sometimes known as polyoxymethylenes, are polymers having repeating units of the structure —O—CH$_2$— and may be derived, for example, from the polymerisation of formaldehyde or its cyclic trimer, trioxane, as described in British Patent 748,836 and British Patent 877,820. The polyoxymethylenes prepared by normal homopolymerisation processes generally contain terminal oxymethylene hydroxide (—OCH$_2$OH)

groups and have been found to be subject to degradation on heating at even quite moderate temperatures. In order to overcome this undesirable characteristic it has been proposed to react the hydroxyl end groups with compounds that will substitute for the relatively unstable hydroxyl group, an end group which is more stable, such as an acetate, ether or urethane group.

I have now found that useful high molecular weight oxymethylene polymers of good stability may be prepared by polymerising a cyclic oligomer of formaldehyde in the presence of certain ethers.

According to the present invention I provide a copolymer comprising the product of polymerising a cyclic oligomer of formaldehyde, preferably trioxane, with a cyclic ether the ring of which contains at least one bivalent aromatic residue, at least two oxygen atoms and at least one aliphatic carbon atom.

Of the cyclic oligomers of formaldehyde, I prefer trioxane because of its ready availability. Tetraoxymethylene is an example of another such cyclic oligomer.

Cyclic ethers that may be used in our invention include, for instance, those derived from pyrocatechol and formaldehyde or a glycol (such as ethylene glycol and higher polymethylene glycols) such as 1,4-benzodioxan and those derived from saligenin such as 1,3-benzodioxan. The linkages to the aromatic rings need not be ortho linkages; for instance, the heptamethylene glycol ether of resorcinol may be used. Cyclic ethers containing more than two ring oxygen atoms may be used in our invention, for example, 1,3,5-benzotrioxepin derived from pyrocatechol and two molecules of formaldehyde.

Of the cyclic ethers that may be used, I prefer the cyclic acetals and especially the cyclic formals such as 1,3-benzodioxan, since they are generally easily prepared and copolymerise smoothly with cyclic oligomers of formaldehyde.

Substituted derivatives of these compounds in which hydrogen atoms are replaced by alkyl, cycloalkyl, aryl, aralkyl and alkenyl groups may be used and the aromatic hydrogen atoms may be replaced in addition by halogen atoms, nitro, alkoxy and nitrile groups.

My preferred compound is the cyclic formal of o-xylylene glycol, that is 1,5-dihydro-2,4-benzodioxepin, because of its ready availability, its solubility in molten trioxane or a mixture of trioxane and solvent (where a solution polymerisation is to be effected) and because of the useful thermal stability of the polymers formed.

The cyclic formal of o-xylylene glycol may be prepared by reacting the glycol with formaldehyde, or a low polymer of formaldehyde such as paraform, in the presence of an acid catalyst such as ferric chloride or p-toluene sulphonic acid. The reaction is preferably effected under reflux. The formal is a white crystalline material with a melting point of 37–38° C.

In order to obtain products of good physical properties, it is preferred that the copolymers contain more than 50% molar of oxymethylene (O—CH$_2$—) units, preferably at least 80% molar. Copolymers containing at least 90% molar of such units are tough, rigid, and very suitable for moulding. I prefer that the copolymer contains at least 0.1% molar and preferably at least 0.5% molar of units other than oxymethylene units since the presence of smaller amounts of these units has not, in general, sufficient effect upon the thermal stability of the copolymer. Copolymers containing from 1.5 to 5 molar percent of such units have useful stability and rigidity and are good moulding materials.

Copolymers containing larger amounts of units derived from the cyclic ether, particularly those containing above 20% molar, are less dimensionally stable and have reduced softening points and are suitable as plasticisers, lubricants, viscosity depressants and the like.

Particularly useful polymers contain at least 90% molar oxymethylene units and have molecular weights of at least 15,000 and preferably 20,000 or more. A molecular weight of 20,000 is approximately equivalent to an inherent viscosity of 1.0 as measured as a 0.5% solution in p-chlorophenol containing 2% of α-pinene at 60° C.

Further according to the present invention we provide a process for the preparation of high molecular weight oxymethylene polymers which comprises polymerising together a cyclic oligomer of formaldehyde and as comonomer, a cyclic ether the ring of which contains at least one bivalent aromatic residue, at least two oxygen atoms and at least one aliphatic carbon atom, the polymerisation being carried out in the presence of an electrophilic catalyst and in the presence of no more than a very small amount of water.

The polymerisation is extremely rapid, requiring only a few minutes and is almost instantaneous in some cases. The yield is generally high, of the order of 80–90% theoretical.

The polymerisation may be effected in bulk or in solution.

Where a bulk process is used, the polymerisation is normally carried out at a temperature at which the polymerisable material is in a molten or substantially molten form. However, for the preparation of high molecular weight polymers, e.g. polymers of molecular weight greater than 15,000 the polymerisation temperature should not be so high as to allow substantial depolymerisation to occur. It is preferred, on the other hand, that a temperature is used at which the comonomer is soluble in trioxane.

It is preferred to effect the polymerisation at temperatures of from about 20° C. to about 100° C. and preferably 50–90° C. but higher temperatures may be used if desired. Where the polymerisation is to be effected under conditions of shear, it is frequently desirable to use temperatures up to 110° C. or above. Where it is desired to use temperatures of above about 115° C. (the boiling point of trioxane) the polymerisation should be carried out under super-atmospheric pressure.

Where the polymerisation is effected in solution, the comonomer is preferably one which is soluble in the mixture of trioxane and solvent. Suitable solvents include hydrocarbons such as hexane, heptane, cyclohexane, benzene,, toluene and xylene and chlorinated hydrocarbons such as methylene chloride, chloroform or carbon tetrachloride. It is preferred to effect the polymerisation at a temperature high enough to prevent the polymerisable compound from crystallising out of solution but at a temperature not above the boiling point of the solution at the working pressure. The polymerisation may be effected under super-atmospheric pressure if desired and this is useful since it permits higher temperatures to be used.

The polymerisation may take place satisfactorily in the presence of very small amounts of water such as would be found as impurities in the oligomer or the comonomer but if good yields of high molecular weight material are to be obtained it is preferred to remove substantially all traces of water from the polymerisation medium. I prefer that the medium contains less than 0.05% by weight of water, more preferably less than 0.03%.

Any electrophilic catalyst may be used in the polymerisation and examples of these are Lewis acids, Friedel-Crafts catalysts, elementary iodine, perchloric acid and acetyl perchlorate. Of these, Lewis acids which are halides are preferred and boron trifluoride in particular has been found to give very good results. The boron trifluoride may be used in unmodified form or as one of its complexes; examples of such complexes include those with water, with organic compounds having an oxygen or sulphur atom which may act as the donor atom (e.g. alcohols, ethers, acids and their sulphur analogues), with organic compounds having a trivalent nitrogen or phosphorous atom (e.g. amines and phosphines) and fluoborate complexes such as those with diazonium compounds. The amount of catalyst used is generally from 0.0001 to 0.1 part by weight of active constituent per 100 parts by weight of monomeric material when it is desired to form high molecular weight products suitable for moulding and similar processes.

The molecular weight of the products of the invention may be controlled by adding chain transfer agents to the polymerisation medium, suitable chain transfer agents being chlorinated hydrocarbons, alkyl acetates and acetals. It is preferred to effect the polymerisation in the substantial absence of oxygen.

I prefer that the polymerisation is effected in bulk or in the presence of only very small amounts of solvent since then the necessity of expensive solvent extraction and recovery processes may be avoided.

In a process according to my invention, the comonomer and trioxane are first carefully dried and are then added to a pre-dried reactor such as a steel bomb. The container may be swept with nitrogen gas and the catalyst is then added alone or as a solution in an inert organic solvent. The container is sealed and heated to about 65° C. and the polymerisation is allowed to take place. After the required time, the polymerisation is brought to a conclusion and the reactor will contain the polymeric products, unreacted trioxane, unreacted comonomer and catalyst residues.

In the production of high polymers as described above the polymerisation temperature is normally less than the softening point of the polymers. As the polymers formed are usually insoluble in the mixture of monomers, the product of a bulk polymerisation product is usually a crumbly mass. To ensure good mixing of the polymerisation and so full growth of the polymer chains, and to form an easily worked powder at the end of the polymerisation, it is desirable to apply shear to the polymerisation mixture during the bulk process.

Conditions of shear may be imposed by any suitable means, such as intense stirring or agitation and the polymerisation may, for example, be carried out in a vessel rotatable on a horizontal axis and having within it freely rolling spheres, rods or the like as described in the specification of Britich Patent No. 749,086. Very good resuits may be obtained if the polymerisation ingredients are fed into a continuous mixer having a screw with an interrupted thread placed in a cylindrical body the inside surface of which has rows of protruding teeth. The screw is made both to rotate and reciprocate so that the teeth on the wall of the cylindrical body pass through the breaks in the screw thread. In this case the polymerisation mass moves forward along a path which has a generally helicoidal shape with an alternate forward and backward movement as it moves towards the outlet. The use of this mixer also has the advantage in that a continuous process may be used. A suitable machine is described in the specification of British Patent No. 626,067.

Therefore, in another process according to the invention the comonomer and trioxane are first carefully dried and then added together with the catalyst to the pre-dried mixer which is heated to the desired temperature. The polymerisation takes place in the mixer which may be pressurised if desired and the polymer is removed from the other end of the mixer in the form of a slurry or powder.

The material so obtained will contain the polymeric product, catalyst residues and possibly unreacted trioxane and unreacted comonomer; the polymeric product comprises the copolymer of trioxane and the comonomer and possibly incidental polyoxymethylenes derived from the homopolymerisation of the trioxane. The catalyst residues are preferably removed as soon after the polymerisation as possible since their presence may also catalyse the decomposition of the polymeric product; they may be removed simply by washing the mix with an aqueous, preferably an aqueous alkaline wash. For example, the mix may be washed with a dilute ammoniacal or caustic soda solution. As is well known, solvents may also be used for removing these catalysts. During their removal the polymer may also be stabilised as is set out below.

The unreacted trioxane and any of the comonomer may be separated from the copolymer by any suitable means such as filtration or solvent extraction. Since trioxane is soluble is most common solvents, it may be separated by a solvent extraction process, e.g. at the same time as the catalyst is removed. The comonomer may also be extracted by a solvent extraction process.

The presence of the incidental polyoxymethylene may adversely affect the stability of the material and this may be remedied either by preferential destruction or by end-group stabilisation of this polyoxymethylene.

The copolymers prepared by the process of the invention contain both oxymethylene groups derived from the trioxane and groups derived from the comonomer and the copolymer chains may therefore be ended by terminal groups of the structure —O—CH$_2$OH or they may be ended by other groups derived from the cyclic ether. Where a copolymer chain is terminated by a —O—CH$_2$OH group, which is readily detachable on heating or under alkaline conditions, the end of the chain may be represented as having the structure

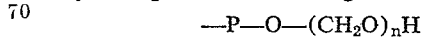

where $n$ is a whole number and P is the divalent organic radical derived from the cyclic ether and nearest to the end of the polymer chain. On subjecting the copolymer chain to a thermal or alkaline degradation reaction, the —O—CH₂OH group will be detached and the oxymethylene group immediately behind it (if any) will receive a hydrogen atom and become an —O—CH₂OH group and the chain will now have the structure $$—P—O(CH_2O)_{n-1}H$$

This next —O—CH₂OH group is now attacked and the degradation of the chain will continue until the —P—O— group is reached. Since the —P—OH group is relatively much more resistant to detachment, the degradation reaction will normally halt there. The copolymer may therefore be stabilised either by subjecting it to such a degradation reaction or by end-group stabilising it. It will be appreciated that under such degradation conditions, any homopolyoxymethylene that may be present will eventually be degraded completely if conditions are sufficiently forcing.

Where it is preferred to destroy the incidental polyoxymethylene and to remove the unstable oxymethylene endgroups from the copolymer, this may be done simply by heating the mixture in an inert atmosphere, e.g. under nitrogen at a temperature of about 160° C. or above after the catalyst residues have been removed; it is preferred not to use too high a temperature since otherwise the copolymer may also be degraded to an undesirable extent. The preferential destruction may also be aided by the addition of a weak acid such as formic acid or acetic acid or an alkali such as caustic soda but the latter is not to be preferred as it may tend to cause undesirable degradation of the copolymer and may convert the formaldehyde so generated into sugar-like polymers.

Stabilisation by removal of these unstable entities may be carried out in an alkaline process for removing the polymerisation catalyst and in this preferred process, the polymer is treated with a basic, preferably ammoniacal, solution at moderately elevated temperatures. However, it is believed that the action of the basic solution may be merely topochemical (see, for instance, pages 231 and 232 of Die Hochmolekularen Organischen Verbindungen by Staudinger, 1932) and for an efficient reaction the polymer is preferably treated either in a finely divided state or in solution and the formation of a solution may be encouraged by carrying out the process under elevated pressure and temperature. The advantage of such a process is that in one step the catalyst, unreacted trioxane and incidental homopolyoxymethylenes may all be removed from the polymer. When the solution is cooled, the desired stable oxymethylene copolymer comes out of solution and may be separated.

Instead of a strong, ammoniacal solution, a solution of an amine, or an amide or an alkali hydroxide such as sodium or potassium hydroxide or a salt of a strong base and weak acid such as sodium carbonate or sodium acetate may be used alone or in combination under similar conditions. The solvent may be water or preferably a mixture of water with a water-miscible alcohol (preferably methanol), with a water-miscible ketone such as acetone or with an ether. The presence of the organic material helps to bring the polymeric material into solution.

When on the other hand it is preferred to end-group stabilise the incidental homopolyoxymethylene and the oxymethylene end-groups of the copolymer, the mixture may be reacted with any suitable compound which will substitute for the terminal hydroxyl group of the polyoxymethylene or copolymer other groups (such as acetate, ether or urethane groups) which are relatively more stable. The end-group stabilisation may be effected for example, by reacting the copolymer mixture with a carboxylic acid, a carboxylic acid ester, a carboxylic acid anhydride, an alcohol, an acetal, an isocyanate, an ortho ester, a ketal, an ortho carbonate, a ketone, a ketene/ketone transformation product, an ether or their substituted derivatives, an epoxide such as ethylene oxide or propylene oxide, an olefine such as butadiene or styrene, an alkyl halide such as tertiary butyl chloride or a vinyl monomer such as acrylonitrile or acrolein. Reaction with a carboxylic acid anhydride such as acetic anhydride is preferred.

The copolymer may be further stabilised against degradation by the addition of any suitable stabilizer for the polyoxymethylene. Suitable stabilisers include, for example, hydrazines, amines, amidines, amides, polyamides, phenols, substituted phenols, polynuclear phenols (particularly alkylene bis-phenols), ureas, thioureas, quinones such as those described in the copending applications Nos. 41,039/61, and 3,474/62 and certain aromatic nitro compounds, such as those described in the copending application No. 3,473/62, alone or in combination. Stabilisers against attack by ultraviolet light, such as hydroxy-substituted benzophenones, may also be incorpoarted into the polymer. Fillers, pigments, mould release agents, lubricants, plasticizers and the like may also be added and the polymer may be blended with other compatible polymeric materials.

The copolymers of the present invention differ from the products of homopolymerising trioxane. The melting points of the copolymers are lower than that of the crystalline homopolymer and the drop in melting point increases with increase in the amount of comonomer in the copolymer.

Also, the melting points of the copolymers are less sharp than that of the homopolymer and the decrease in definition becomes more marked as the amount of comonomer in the copolymer increases. For example, the homopolymers of trioxane have a crystalline melting point of 170° C. while a copolymer derived from trioxane and the cyclic formal of o-xylylene glycol containing about 2 mole percent of units derived from the formal in the chain has a melting range of 154–160° C.

Because of the width of melting range of my copolymers, the conditions required for moulding or otherwise fabricating them in massive form are not as critical as those required for the homopolymer and they lend themselves, therefore, to easier fabrication and are of particular interest for film-forming compositions. These copolymers, therefore, are commercially more attractive as moulding materials than the homopolymers.

The rate of thermal degradation of the copolymers, particularly of those which have been stabilised by the methods described, is substantially less than that of the homopolymer. For example, the rate of loss in weight at 222° C. of a homopolyoxymethylene derived from trioxane is about 3% per minute while the equivalent rates for my copolymers which have been subjected to an ammoniacal wash treatment are generally less than 0.5% per minute and may be as low as 0.03% per minute.

The rate of loss in weight at 222° C. is measured by suspending a weighed portion of the polymer in an open-ended ampoule, having a narrow neck which has been curved through about 180°, which is itself about two-thirds immersed in the vapours of boiling methyl salicylate. At regular timed intervals, the ampoule is removed, cooled in ice and reweighted. Thereafter, it is re-immersed in the methyl salicylate vapour and the cycle repeated. 20 minutes is the minimum test period.

This surprising stability at temperatures well in excess of their melting points makes these copolymers suitable in the manufacture of articles which may be subjected during their life to elevated temperature (for example as insulants in electrical switch gear.)

My copolymers, containing at least 90 molar percent of oxymethylene groups are tough and dimensionally stable at or above room temperature and their very low rate of thermal degradation makes them particularly useful as moulding materials (e.g. for use in injection moulding, compression moulding and extrusion processess) and for the melt-spinning and -casting of fibres and films. I prefer my mouldable polymers to have a softening point of at least 150° C.

The copolymers may also be solvent cast to give films or solvent spun to give fibres from suitable solvents, examples of which are o- and p-chlorophenol, benzyl alcohol and α-naphthol.

These polymers may be used, for example, in the light engineering industry for the manufacture of small gears, roller bearings, bushes, clips and cams; in the motor industry for the manufacture of dust covers or caps for grease nipples and bearings such as track-rod joints, lamp covers, instrument housings, low stressed gears such as oil pump gears, speedometer gears and windscreen wiper gears, self-lock nuts and other small mouldings.

My copolymers containing lesser amounts of oxymethylene groups have reduced strength, rigidity and softening point but are suitable as plasticisers, lubricants, viscosity depressants and the like.

The presence of aromatic groups in the polymer chain, particularly if they are substituted by for example nitro groups, improves the dye receptivity of the polymer.

The invention is illustrated by the following examples in which all parts are expressed as parts by weight.

EXAMPLE I

*Preparation of cyclic formal of o-xylylene glycol*

35.9 parts of o-xylylene glycol having a melting point of 57° C. and prepared from the reduction of phthalic anhydride with lithium aluminium hydride were refluxed with 7.5 parts of paraform, 0.2 part of p-toluene-sulphonic acid and 176 parts of benzene in a Dean and Stark separator until 2.5 parts water had been removed. Benzene distilled out to leave a brown liquid from which a white solid crystallised on standing. This was filtered off and the filtrate was fractionally distilled at 0.7 mm. of Hg (B. Pt. 97–107° C.) to give a white crystalline mass which upon recrystallisation from ether yielded 13.8 parts of the cyclic formal. The melting point was 37–38° C. and the analysis showed C, 72.1%; H, 6.47%. ($C_9H_{10}O_2$ requires C, 72.0%; H, 6.67%.)

EXAMPLE II 28.0 parts of trioxane were mixed with 3.5 parts of o-xylylene glycol cyclic formal in a polymerisation vessel at 68° C., and to the mixture was added 0.00764 part of boron trifluoride diethyletherate in 0.71 part of ether.

Polymerisation was almost instantaneous and the mass was cooled after 2 minutes, ground to fine powder, washed with acetone and dried. It was then heated at 150° C. for 30 minutes in an autoclave with 200 parts of water, 159 parts of methanol and 4.4 parts of .880 ammonia. The mixture was then cooled and washed with water followed by acetone and dried at 80° C. under vacuum for 16 hours to yield 23.9 parts of a white powder having an inherent viscosity (measured as a 0.1% solution in p-chlorophenol containing 2% of α-pinene at 60° C.) of 0.89. The polymer had a rate of loss in weight of 0.03% per minute up to 350 minutes, assuming first order kinetics.

Tough, flexible films were prepared by compression moulding the polymer at 185° C. under 15 tons pressure between plates coated with polytetrafluoroethylene. The infrared spectrum of the polymer indicated the presence of about 2 mole percent of xylylene units in the oxymethylene chain and the polymer had a melting range of 154° C. to 160° C., the first temperature being that at which 50% of the sample was molten and the second being that at which the sample was wholly molten.

EXAMPLE III 32.6 parts of trioxane were mixed with 1.63 parts of the cyclic formal of o-xylylene glycol in a polymerisation vessel at 78° C. to which was then added 0.003 part of boron trifluoride diethyl etherate dissolved in 0.35 part ether. The polymerisation was complete in 3 minutes and the polymer was worked up as above. The product was then refluxed for 6 hours with 150 parts of water, 119.3 parts of methanol and 4.4 parts of 880 ammonia, washed with water and acetone and dried at 80° C. under vacuum for 16 hours. Yield: 25.9 parts of a white powder having an inherent viscosity of 1.1 and a rate of loss in weight at 222° C. of 0.08% per minute after an initial rapid loss of 4.8%.

Strong fibres could be melt spun from the polymer at 190° C.

I claim:

1. A moldable solid copolymer of trioxane and 1,5-dihydro-2,4-benzodioxepin in which from 90% to 99.5% of the recurring units are oxymethylene (—$OCH_2$—) units and from 0.5 to 10%, of the recurring units are oxy-o-xylylene (—$OCH_2$—o-$C_6H_4CH_2$—) units and having an inherent viscosity of at least 1.0 measured at 60° C. as a 0.5% solution in p-chlorophenol containing 2% α-pinene.

2. A copolymer of trioxane and 1,5-dihydro-2,4-benzodioxepin according to claim 1 in which from 95% to 98.5% of the recurring units are oxymethylene (—$OCH_2$—)

units and from 1.5 to 5% of the recurring units are oxy-o-xylylene (—$OCH_2$—o-$C_6H_4CH_2$—) units.

3. A copolymer of trioxane and 1,5-dihydro-2,4-benzodioxepin according to claim 1 which is substantially free from terminal oxymethylene hydroxide (—$OCH_2OH$) groups.

4. A copolymer of trioxane and 1,5-dihydro-2,4-benzodioxepin according to claim 1 which is substantially free from terminal oxymethylene hydroxide (—$OCH_2OH$) groups and has a rate of loss in weight measured at about 222° C. of less than 0.5% per minute, assuming first order kinetics.

5. A copolymer of trioxane and 1,5-dihydro-2,4-benzodioxepin according to claim 1 which is substantially free from terminal oxymethylene hydroxide (—$OCH_2OH$) groups and has a rate of loss in weight measured at about 222° C. of up to 0.03% per minute, assuming first order kinetics.

6. A process for preparing an oxymethylene polymer comprising (a) maintaining at a temperature of at least 20° C. a mixture containing less than 0.05% by weight of water and comprising (i) trioxane, (ii) from 0.003 to 1 mole per mole of trioxane of 1,5-dihydro-2,4-benzodioxepin, and (iii) an electrophilic catalyst selected from the group consisting of Lewis acids, elementary iodine, perchloric acid and acetyl perchlorate in an amount to yield from 0.0001 to 0.1 part of active constituent per 100 parts by weight of the combination of trioxane and 1,5-dihydro-2,4-benzodioxepin, and (b) recovering a copolymer of trioxane and 1,5-dihydro-2,4-benzodioxepin.

7. A process according to claim 6 in which from fifteen one-thousandths to five one-hundredths of a mole of 1,5-dihydro-2,4-benzodioxepin is present for each mole of trioxane.

8. A process according to claim 6 in which the polymeric product is treated with a hot solution of ammonia to remove terminal oxymethylene hydroxide (—$OCH_2OH$) groups.

9. A process according to claim 6 in which the polymeric product is dissolved under pressure in a hot solution of ammonia in water and methanol to remove terminal oxymethylene hydroxide (—$OCH_2OH$) groups.

10. A process for preparing a moldable thermoplastic comprising maintaining at a temperature of from 50 to 90° C. a mixture comprising (i) trioxane, (ii) from 0.003 to 0.125 mole per mole of trioxane of 1,5-dihydro-2,4-benzodioxepin, and (iii) an amount of an electrophilic catalyst selected from the group consisting of boron trifluoride, fluoroborate complexes with diazonium compounds, and coordinate complexes of boron trifluoride with a member of the group consisting of water and organic compounds in which the donor atom is taken from the class consisting of oxygen, sulfur, trivalent nitrogen, and trivalent phosphorus sufficient to yield from 0.0001 to 0.1 part of active constituent per 100 parts by weight of the combination of trioxane and 1,5-dihydro-2,4-benzodioxepin, thereafter refluxing the polymeric product in a solution of ammonia to remove terminal oxymethylene (—OCH$_2$OH) hydroxide groups and recovering a normally solid copolymer of trioxane and 1,5-dihydro-2,4-benzodioxepin.

References Cited by the Examiner

UNITED STATES PATENTS

| | | | |
|---|---|---|---|
| 3,000,860 | 9/1961 | Brown et al. | 260—67 |
| 3,027,352 | 3/1962 | Walling et al. | 260—67 |
| 3,068,294 | 12/1962 | Rosen et al. | 260—67 |

FOREIGN PATENTS

| | | |
|---|---|---|
| 582,945 | 9/1959 | Canada. |
| 626,067 | 7/1949 | Great Britain. |

OTHER REFERENCES

Derwent Belgian Patents Reports, 72A, Feb. 10, 1961, C8.

English Translation from Kunststoffe, vol. 53, 1963, pp. 426–436 (pp. 11–21 relied on).

WILLIAM H. SHORT, *Primary Examiner.*